US010618460B1

(12) United States Patent
Baek et al.

(10) Patent No.: US 10,618,460 B1
(45) Date of Patent: Apr. 14, 2020

(54) APPARATUS FOR CONTROLLING VEHICULAR HEADLAMP, METHOD OF CONTROLLING VEHICULAR HEADLAMP THEREOF, AND VEHICLE INCLUDING APPARATUS

(71) Applicants: Hyundai Motor Company, Seoul (KR); Kia Motors Corporation, Seoul (KR)

(72) Inventors: Jei Hyun Baek, Gyeonggi-do (KR); Jae Woong Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/572,090

(22) Filed: Sep. 16, 2019

(30) Foreign Application Priority Data

Jun. 7, 2019 (KR) .......................... 10-2019-0067394

(51) Int. Cl.
*B60Q 1/02* (2006.01)
*B60Q 1/14* (2006.01)

(52) U.S. Cl.
CPC ............... *B60Q 1/143* (2013.01); *B60Q 1/02* (2013.01); *B60Q 2300/122* (2013.01); *B60Q 2300/41* (2013.01); *B60Q 2300/42* (2013.01)

(58) Field of Classification Search
CPC ...... B60Q 1/02; B60Q 1/143; B60Q 2300/41; B60Q 2300/42; B60Q 2300/122
See application file for complete search history.

(56) References Cited

U.S. PATENT DOCUMENTS

| 2015/0062937 A1* | 3/2015 | Kasai | ..................... B60Q 1/085 362/466 |
| 2015/0149045 A1* | 5/2015 | Mizuno | ................ B60Q 1/1423 701/49 |

\* cited by examiner

*Primary Examiner* — Thuy V Tran
(74) *Attorney, Agent, or Firm* — Mintz Levin Cohn Ferris Glovsky and Popeo, P.C.; Peter F. Corless

(57) ABSTRACT

An apparatus for controlling a vehicular headlamp is provided. The apparatus includes an image capture unit that acquires a surrounding image of a subject vehicle, a steering angle detection unit that detects a steering angle of the subject vehicle, and a controller operates a headlamp of the subject vehicle based on the steering angle. The controller detects whether a forward vehicle is present from the acquired surrounding image when the headlamp of the subject vehicle is turned on, and detect whether the forward vehicle is positioned within a set region of the image when the forward vehicle is present. Some of high beams of the headlamp are turned off based on the detected steering angle when the forward vehicle is positioned within the set region of the image.

20 Claims, 8 Drawing Sheets

APPARATUS FOR CONTROLLING VEHICULAR HEADLAMP, METHOD OF CONTROLLING VEHICULAR HEADLAMP THEREOF, AND VEHICLE INCLUDING APPARATUS

CROSS REFERENCE TO RELATED APPLICATION(S)

This application claims the benefit of Korean Patent Application No. 10-2019-0067394, filed on Jun. 7, 2019, which is hereby incorporated by reference as if fully set forth herein.

BACKGROUND

Field of the Invention

The present invention relates to an apparatus for controlling a vehicular headlamp, and more particularly, to an apparatus for controlling a vehicular headlamp that adjusts a driving beam of a headlamp that illuminates a preceding vehicle and an oncoming vehicle to be adapted to a change in a driving condition, corresponding to a lane change and a turn.

Discussion of the Related Art

A recent vehicle headlamp system includes an intelligent front-lighting system (IFS) function. The IFS function is obtained by improving a high beam assist (HBA). In particular, the HBA function recognizes a preceding vehicle and an oncoming vehicle using a camera and automatically turns a driving beam on or off based on the recognition result while driving at night or during poor lighting conditions.

The IFS function recognizes a preceding vehicle and an oncoming vehicle using a camera, turns off some or all of driving beams that illuminate the preceding vehicle and the oncoming vehicle based on the recognition result to avoid subjecting drivers of other vehicles to glare, and maintains the remaining driving beams turned on to enhance the visibility of a driver while driving at night. According to the IFS function, whether to activate the IFS function may be determined through brightness recognized by a camera and some or all of high beams, corresponding to a target portion, may be turned off by recognizing the oncoming vehicle and the preceding vehicle.

However, according to the IFS function, when a camera faces forward (e.g., in the driving direction of the vehicle), the positions of the oncoming vehicle and the preceding vehicle are accurately recognized to turn off a high beam with respect to an intended object, but when a driving condition changes, for example, when a vehicle changes lanes or turns, even when the positions of the oncoming vehicle and the preceding vehicle are recognized, a high beam is not turned off with respect to an intended object. Instead, a high beam is turned off with respect to an unintended object, and thus a high beam is turned on with respect to the positions of the oncoming vehicle and the preceding vehicle.

Accordingly, there is a need to develop an apparatus for controlling a vehicular headlamp for preventing a malfunction in which a high beam is turned on with respect to positions of an oncoming vehicle and a preceding vehicle even if a driving condition changes, for example, if a vehicle changes lanes or turns.

SUMMARY

Accordingly, the present invention is directed to an apparatus for controlling a vehicular headlamp, a method of controlling a vehicular headlamp thereof, and a vehicle including the apparatus that substantially obviates one or more problems due to limitations and disadvantages of the related art. An object of the present invention is to provide an apparatus for controlling a vehicular headlamp, a method of controlling a vehicular headlamp thereof, and a vehicle including the apparatus, for preventing a malfunction of a high beam and avoiding subjecting drivers of the other vehicles to glare by turning off some of high beams of a headlamp based on a steering angle of a subject vehicle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for controlling a vehicular headlamp may include an image capture unit configured to acquire a surrounding image of a subject vehicle, a steering angle detection unit configured to detect a steering angle of the subject vehicle, and a controller configured to operate a headlamp of the subject vehicle based on the steering angle of the subject vehicle. The controller may be configured to detect whether a forward vehicle is present from the acquired surrounding image when the headlamp of the subject vehicle is turned on, detect whether the forward vehicle is positioned within a set region of the image when the forward vehicle is present, and turn off some of high beams of the headlamp based on the detected steering angle of the subject vehicle when the forward vehicle is positioned within the set region of the image.

In another aspect of the present invention, a method of controlling a headlamp of an apparatus for controlling a vehicular headlamp, including an image capture unit, a steering angle detection unit, and a controller configured to operate a headlamp of a subject vehicle may include detecting whether the headlamp of the subject vehicle is turned on, detecting whether a forward vehicle is present from a surrounding image acquired by the image capture unit upon turning on the headlamp of the subject vehicle, detecting whether the forward vehicle is positioned within a set region of the image when the forward vehicle is present, and turning off some high beams of the headlamp based on a steering angle of the subject vehicle, detected by the steering angle detection unit, when the forward vehicle is positioned within the set region of the image.

In another aspect of the present invention, a non-transitory computer readable recording medium may have recorded thereon a program for executing the method.

In yet another aspect of the present invention, a vehicle including a headlamp control apparatus includes a headlamp including a high beam, and the headlamp control apparatus may configured to operate the headlamp according to a steering angle. The headlamp control apparatus may include an image capture unit configured to acquire a surrounding image of a subject vehicle, a steering angle detection unit configured to detect the steering angle of the subject vehicle, and a controller configured to detect whether a forward vehicle is present from the acquired surrounding image when the headlamp is turned on, to detect whether the forward vehicle is positioned in a set region of the image when the forward vehicle is present, and to operate the headlamp to turn off some high beams of the headlamp based on the detected steering angle of the subject vehicle when the forward vehicle is positioned within the set region of the image.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
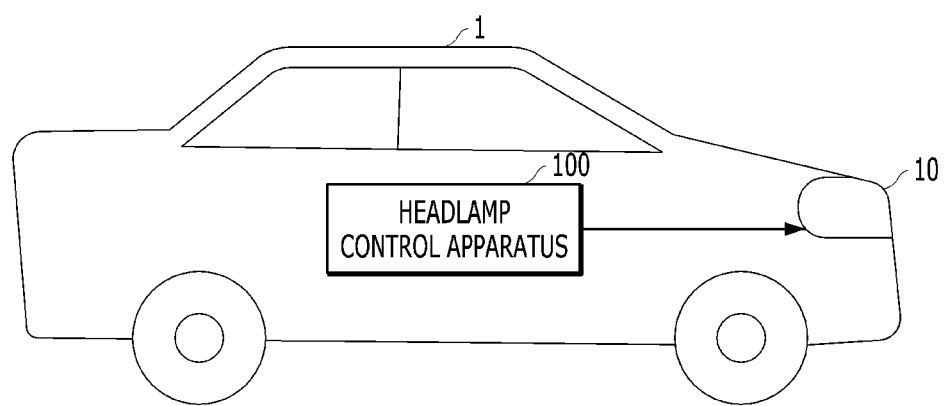
FIG. 1 is a schematic diagram of a vehicle including a headlamp control apparatus according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Exemplary embodiments of the present invention are described in detail so as for those of ordinary skill in the art to easily implement the invention with reference to the accompanying drawings. However, the present invention may be implemented in various different forms and is not limited to these embodiments. To clearly describe the present invention, parts unrelated to the description are omitted in the drawings and like reference numerals in the specification denote like elements.

Throughout the specification, one of ordinary skill would understand terms "include", "comprise", and "have" to be interpreted by default as inclusive or open rather than exclusive or closed unless expressly defined to the contrary. As used herein, the singular forms "a", "an" and "the" are intended to include the plural forms as well, unless the context clearly indicates otherwise. Further, terms such as "unit", "module", etc. disclosed in the specification mean units for processing at least one function or operation, which may be implemented by hardware, software, or a combination thereof. Throughout the specification, when a certain part "includes" a certain component, this indicates that the part may further include another component instead of excluding another component unless there is no different disclosure. The same reference numbers will be used throughout the drawings to refer to the same parts.

Hereinafter, with reference to FIGS. 1 to 9, an apparatus for controlling a vehicular headlamp, a method of controlling a vehicular headlamp thereof, and a vehicle including the apparatus, which are applicable to exemplary embodiments of the present invention, will be described in detail.

FIG. 1 is a schematic diagram of a vehicle including a headlamp control apparatus according to an exemplary embodiment of the present invention.

As shown in FIG. 1, a vehicle 1 according to the present invention may include a headlamp 10, including a high beam, and a headlamp control apparatus 100 configured to operate the headlamp 10 based on a steering angle of the vehicle 1. In particular, the headlamp control apparatus 100 may be configured to detect whether a forward vehicle is present from an acquired surrounding image when the headlamp 10 is turned on, detect whether the forward vehicle is positioned within a set region of the image, and operate the headlamp 10 to turn off some of high beams of the headlamp 10 based on a detected steering angle of a subject vehicle when the forward vehicle is positioned within the set region of the image.

For example, when the forward vehicle is present in a set region of a surrounding image acquired by a camera, the headlamp control apparatus 100 may be configured to turn off some of the high beams of the headlamp 10 to avoid subjecting the driver of the forward vehicle to glare and may be configured to turn on the remaining high beams to enhance the visibility of a driver of the subject vehicle. However, when the subject vehicle changes lanes or turns, the forward vehicle is positioned in a region in which light is emitted from high beams other than the high beams that are turned off, and thus the driver may still be subjected to glare due to the high beams of the subject vehicle.

Accordingly, the headlamp control apparatus 100 according to the present invention may be configured to detect a driving direction of the subject vehicle based on a steering angle of the subject vehicle and turn a high beam off based on the driving direction, thereby enhancing accuracy and reliability. According to the present invention, even when a driving condition is changed, for example, if the subject vehicle changes lanes or turns, a malfunction in which a high beam is turned on with respect to positions of the oncoming vehicle and the preceding vehicle may be prevented.

Figure 2:
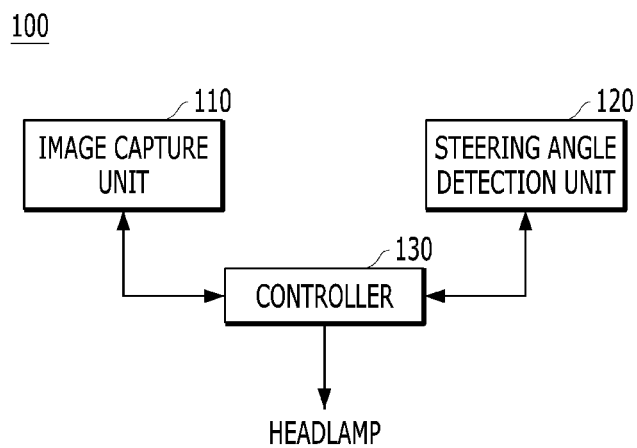
FIG. 2 is a block diagram of an apparatus for controlling a vehicular headlamp according to an exemplary embodiment of the present invention.

FIG. 2 is a block diagram of an apparatus for controlling a vehicular headlamp according to an exemplary embodiment of the present invention. As shown in FIG. 2, the headlamp control apparatus 100 according to the present invention may include an image capture unit 110 configured to acquire a surrounding image of a subject vehicle, a steering angle detection unit 120 configured to detect a steering angle of the subject vehicle, and a controller 130 configured to operate a headlamp of the subject vehicle based on a steering angle of the subject vehicle. The controller 130 may also be configured to operate the image capture unit 110 and the steering angle detection unit 120.

In particular, the controller 130 may be configured to detect whether the forward vehicle is present based on a surrounding image that is acquired when a headlamp of the subject vehicle is turned on, detect whether a forward vehicle is positioned within a set region of the image when the forward vehicle is present, and turn off some of the high beams of the headlamp based on the detected steering angle of the subject vehicle when the forward vehicle is positioned within the set region of the image. For example, the image capture unit 110 may include a camera configured to capture the area in front of the subject vehicle, without being limited thereto. The steering angle detection unit 120 may include a steering angle sensor configured to sense the steering angle of a steering wheel, without being limited thereto.

When detecting whether the forward vehicle is present from the acquired surrounding image, the controller 130 may be configured to detect whether a forward vehicle, including at least one of the preceding vehicle or the oncoming vehicle, is in the acquired surrounding image. In addition, when detecting whether the forward vehicle is positioned within the set region of the image, the controller 130 may be configured to calculate coordinates of the forward vehicle positioned in the image and detect the position of the forward vehicle in the image based on the calculated coordinates when the forward vehicle is present, and detect whether the forward vehicle is positioned within the set region of the image based on the position of the forward vehicle. In particular, when calculating the coordinates of the forward vehicle positioned in the image, if a plurality of forward vehicles are present, the controller 130 may be configured to calculate all of the plurality of forward vehicles positioned within the image.

The coordinates of the forward vehicle may be calculated to extract a forward vehicle positioned within the set region of the image to turn off some of the high beams of a headlamp that illuminates the position of the extracted forward vehicle. For example, when detecting whether the forward vehicle is positioned within the set region, the controller 130 may be configured to detect that the forward vehicle is positioned within the set region when the forward vehicle is positioned within a central region of the acquired image. In another example, when detecting whether the forward vehicle is positioned within the set region, the controller 130 may be configured to detect that the forward vehicle is positioned within the set region when the forward vehicle is positioned within a driving lane of the subject vehicle in the acquired image.

In another example, when detecting whether the forward vehicle is positioned within the set region, the controller 130 may be configured to detect that the forward vehicle is positioned within the set region if a first condition, in which the forward vehicle is positioned within a central region of the acquired image and a second condition, in which the forward vehicle is positioned within a driving lane of the subject vehicle, are satisfied.

Additionally, when detecting whether the forward vehicle is positioned within the set region, the controller 130 may be configured to detect whether the forward vehicle is positioned to overlap the set region by about 50% or more if the forward vehicle is positioned at a boundary of the set region, and detect that the forward vehicle is positioned within the set region if the forward vehicle overlaps the set region by about 50% or more. In particular, when determining whether the forward vehicle overlaps the set region by about 50% or more, the controller 130 may be configured to detect that the forward vehicle is not positioned within the set region if the forward vehicle does not overlap the set region by about 50% or more.

Then, when some of the high beams of a headlamp are turned off based on the detected steering angle of the subject vehicle, the controller 130 may be configured to detect whether the detected steering angle of the subject vehicle is greater than a preset reference value if the forward vehicle is positioned within the set region of the image. The controller may be configured to turn off a left high beam positioned in a left region of the headlamp among the high beams of the headlamp or a right high beam positioned in a right region of the headlamp among the high beams of the headlamp if the steering angle of the subject vehicle is greater than a reference value.

When turning off the left high beam or the right high beam of the headlamp, the controller 130 may be configured to detect whether the high beam of the headlamp is turned on when the steering angle of the subject vehicle is greater than the reference value, and turn off the left high beam or the right high beam if the high beam of the headlamp is turned on. In particular, when detecting whether the high beam of the headlamp is turned on, the controller 130 may be configured to terminate control of the headlamp of the subject vehicle when the high beam of the headlamp is not turned on.

Depending on the case, when turning off the left high beam or the right high beam of the headlamp, the controller 130 may be configured to detect a turning direction of the subject vehicle based on the steering angle of the subject vehicle, and also turn off the left high beam or the right high beam of the headlamp based on the turning direction of the subject vehicle if the steering angle of the subject vehicle is greater than a reference value.

Particularly, when turning off the left high beam or the right high beam of the headlamp based on the turning direction of the subject vehicle, the controller 130 may be configured to turn off the left high beam, positioned in a left region of the headlamp, among high beams of the headlamp, if the turning direction of the subject vehicle is recognized as a right direction, and turn off the right high beam positioned in a right region of the headlamp among high beams of the headlamp if the turning direction of the subject vehicle is recognized as a left direction.

In another case, when turning off the left high beam or right high beam of the headlamp, the controller 130 may be configured to detect whether the high beam of the headlamp is turned off if the steering angle of the subject vehicle is greater than the reference value, and detect the turning direction of the subject vehicle based on the steering angle of the subject vehicle. The controller 130 may be configured to turn off the left high beam or the right high beam of the headlamp based on the turning direction of the subject vehicle if the high beam of the headlamp is turned on. In particular, when detecting whether the high beam of the headlamp is turned on, the controller 130 may be configured to terminate control of the headlamp of the subject vehicle if the high beam of the headlamp is not turned on.

When turning off the left high beam or the right high beam of the headlamp according to the turning direction of the subject vehicle, the controller 130 may be configured to turn off the left high beam positioned in the left region of the headlamp among high beams of the headlamp if the turning direction of the subject vehicle is recognized as a right direction, and turn off the right high beam positioned in the right region of the headlamp among high beams of the headlamp if the turning direction of the subject vehicle is recognized as a left direction.

Further, when turning off the left high beam, the controller 130 may be configured to detect whether the forward vehicle is present at a front right side of the subject vehicle, and turn on the right high beam positioned in the right region of the headlamp and turn off a center high beam positioned in a central region of the headlamp among high beams of the headlamp if the forward vehicle is present at the front right side of the subject vehicle.

Particularly, when detecting whether the forward vehicle is present at the front right side of the subject vehicle, the controller 130 may be configured to turn on the right high beam positioned in the right region of the headlamp and the center high beam of the central region of the headlamp among high beams of the headlamp if the forward vehicle is not present at the front right side of the subject vehicle. When turning off the right high beam, the controller 130 may be configured to detect whether the forward vehicle is present at a front left side of the subject vehicle, and turn on the left high beam present in the left region of the headlamp and turn off the center high beam positioned in the central region of the headlamp among high beams of the headlamp if the forward vehicle is present at the front left side of the subject vehicle.

When detecting whether the forward vehicle is present at the front left side of the subject vehicle, the controller 130 may be configured to turn on the left high beam positioned in the left region of the headlamp and turn on the center high beam positioned in the central region of the headlamp among the high beams of the headlamp if the forward vehicle is not present at the front left side of the subject vehicle. When detecting whether the detected steering angle of the subject vehicle is greater than a preset reference value, the controller 130 may be configured to detect the steering angle as a driving change including a lane change or a turn of the subject vehicle if the steering angle of the subject vehicle is greater than the reference value.

When detecting whether the detected steering angle of the subject vehicle is greater than the preset reference value, the controller 130 may be configured to turn off some high beams that illuminate the forward vehicle positioned in the set region of the image among the high beams of the headlamp if the detected steering angle of the subject vehicle is less than the reference value. For example, when turning off some high beams, the controller 130 may be configured to turn off the center high beam, positioned in the central region of the headlamp, without being limited thereto.

Accordingly, some of the high beams of the headlamp may be turned off based on the steering angle of the subject vehicle, thereby preventing a malfunction of the high beam and avoiding subjecting other drivers to glare.

Figure 3:
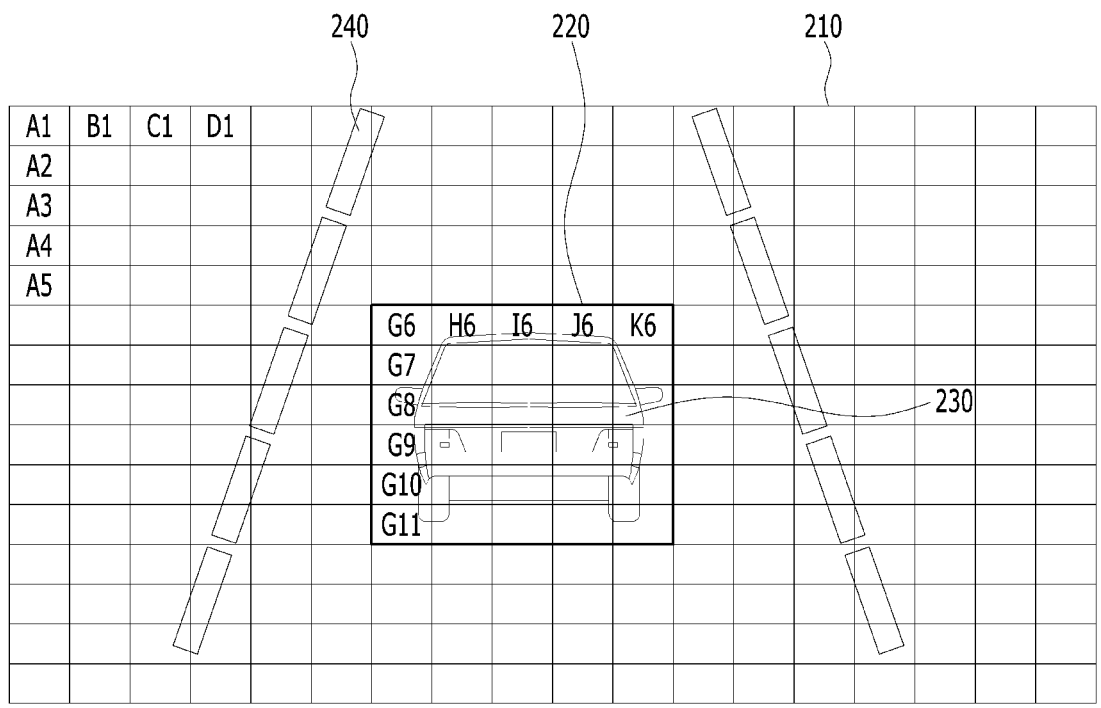
FIG. 3 is a diagram of a procedure of recognizing a position of a forward vehicle in an image acquired from the image capture unit of FIG. 2 according to an exemplary embodiment of the present invention.

FIG. 3 is a diagram of a procedure of recognizing a position of a forward vehicle in an image acquired from the image capture unit of FIG. 2. As shown in FIG. 3, according to the present invention, whether a forward vehicle 230 is present may be detected from a surrounding image 210 acquired by the image capture unit, and whether the forward vehicle 230 is positioned within a set region 220 of the image 210 may be detected.

In particular, the forward vehicle 230 may be at least one of a preceding vehicle or an oncoming vehicle, which is positioned ahead of the subject vehicle. According to the present invention, when detecting whether the forward vehicle 230 is positioned within the set region 220 of the image 210, coordinates of the forward vehicle positioned in the image 210 may be calculated, the position of the forward vehicle 230 in the image 210 may be recognized based on the calculated coordinates, and whether the forward vehicle 230 is positioned within the set region 220 of the image 210 may be detected based on the position of the forward vehicle 230.

For example, as shown in FIG. 3, a position of the forward vehicle 230, which is recognized using a camera, may correspond to image coordinates G6 to K6 and G6 to G11. According to the present invention, the forward vehicle 230 may be detected to be positioned within a central region as the set region 220 of the image 210 may be detected based on the coordinate information, and a high beam that illuminates a central front region may be turned off and a high beam that illuminates the remaining region except for the central front region may be kept turned on to prevent the high beam of the headlamp from emitting light to the central front region.

Accordingly, when the forward vehicle 230 is positioned within the central region of the acquired image 210, the forward vehicle 230 may be detected to be positioned within the set region 220. Depending on the case, when the forward vehicle 230 is positioned within a driving lane 240 of the subject vehicle in the acquired image 210, the forward vehicle 230 may also be detected to be positioned within the set region 220.

In another case, when a first condition in which the forward vehicle 230 is positioned within the central region of the acquired image 210 and a second condition in which the forward vehicle 230 is positioned within the driving lane 240 of the subject vehicle are satisfied, the forward vehicle 230 may also be detected to be positioned within the set region 220. In addition, when the forward vehicle 230 is positioned at a boundary of the set region 220, whether the forward vehicle 230 overlaps the set region 220 by about 50% or more may be detected. When the forward vehicle 230 overlaps the set region 220 by about 50% or more, the forward vehicle 230 may also be detected to be positioned within the set region 220.

Figure 4:
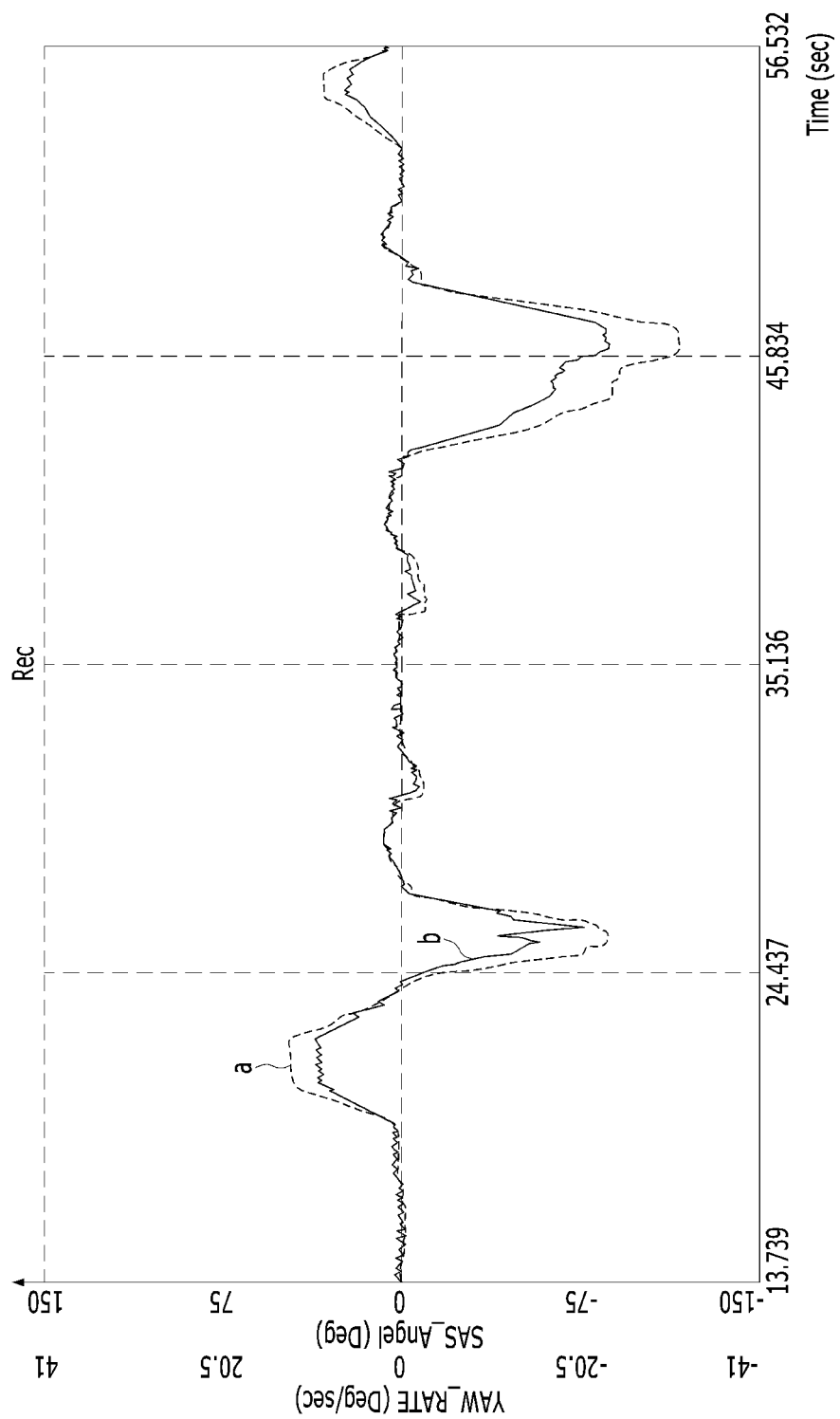
FIG. 4 is a graph of a steering angle detection procedure of the steering angle detection unit of FIG. 2 according to an exemplary embodiment of the present invention.

FIG. 4 is a graph of a steering angle detection procedure of the steering angle detection unit of FIG. 2. As shown in FIG. 4, according to the present invention, the steering angle of the subject vehicle may be detected, and some of the high beams of the headlamp may be turned off based on the detected steering angle of the subject vehicle.

As shown in FIG. 4, when a driving condition changes, for example, when the subject vehicle changes lanes or turns, a steering angle 'a' and a yaw rate 'b' of the subject vehicle are changed. According to the present invention, when the steering angle of the subject vehicle is detected by the steering angle detection unit, a driving direction of the subject vehicle may be detected based on the detected steering angle, and the high beams of the headlamp may be turned on or off based on the detected driving direction.

In other words, whether the steering angle of the subject vehicle is greater than a preset reference value may be detected. When the steering angle of the subject vehicle is greater than the reference value, the left high beam positioned in the left region of the headlamp or the right high beam positioned in the right region of the headlamp among the high beams of the headlamp may be turned off. For example, when the steering angle of the subject vehicle is greater than the reference value and the turning direction of the subject vehicle is a right direction, the forward vehicle is positioned at a front left side of the subject vehicle, and thus the left high beam positioned in the left region of the headlamp among the high beams of the headlamp may be turned off, thereby avoiding subjecting the driver of the forward vehicle to glare.

In addition, when the steering angle of the subject vehicle is greater than the reference value and the turning direction of the subject vehicle is a left direction, the forward vehicle is positioned at a front right side of the subject vehicle, and thus the right high beam positioned in the right region of the headlamp among the high beams of the headlamp may be turned off, thereby avoiding subjecting the driver of the forward vehicle to glare. When the steering angle of the subject vehicle is equal to or less than the reference value, the forward vehicle is positioned at a central front side of the subject vehicle, and thus the center high beam positioned in the central region of the headlamp among the high beams of the headlamp may be turned off, thereby avoiding subjecting the driver of the forward vehicle to glare.

When the subject vehicle changes lanes, a region viewed through a camera does not correspond to the direction in which the subject vehicle is actually being driven, and thus the high beam may emit light in an unintended direction. Accordingly, the high beam of the headlamp may be finely adjusted using a direction and an angle value of the steering wheel. In other words, a direction in which the subject vehicle is directed or a degree by which an angle of the subject vehicle is changed may be determined through a steering angle sensor (SAS) value.

According to the present invention, data regarding whether the vehicle is driven substantially straight or whether the vehicle changes lanes using on SAS data may be received in real time. When data with an SAS value equal to or greater than a predetermined value is received, a direction in which the high beam emits light may be changed via comparison with previous image data.

FIGS. 5 to 8 are diagrams of a procedure of turning off some of high beams of a headlamp based on a steering angle of a subject vehicle. As shown in FIGS. 5 to 8, an image of a forward vehicle may be acquired using a camera, the steering angle of the subject vehicle may be detected when the forward vehicle is positioned within the set region in an image, and some of the high beams of the headlamp may be turned off based on the detected steering angle. In other words, a driving direction of the subject vehicle may be detected based on the detected steering angle, and the high beams of the headlamp may be turned on or off based on the detected driving direction.

Figure 5:
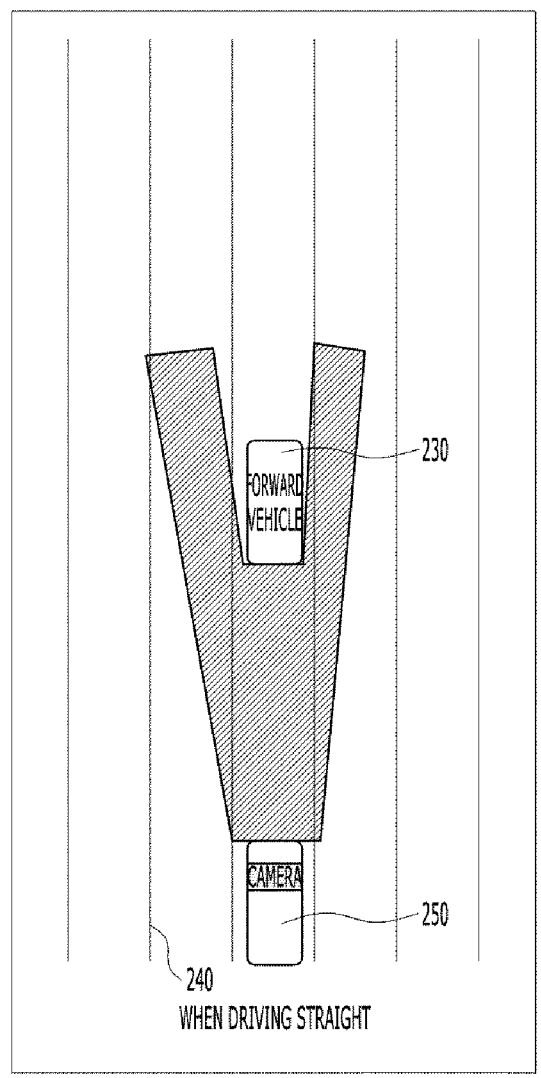
FIGS. 5 to 8 are diagrams of a procedure of turning off some of high beams of a headlamp based on a steering angle of a subject vehicle according to an exemplary embodiment of the present invention.

As shown in FIG. 5, according to the present invention, when a steering angle of a subject vehicle 250 is equal to or less than a reference value, the subject vehicle may be recognized to be driven substantially straight and the forward vehicle 230 may be recognized to be positioned at a central front side of the lane 240 in which the subject vehicle 250 is driven. Accordingly, a center high beam positioned in a central region of the headlamp among the high beams of the headlamp of the subject vehicle 250 may be turned off, thereby avoiding subjecting the driver of the forward vehicle to glare.

Figure 6:
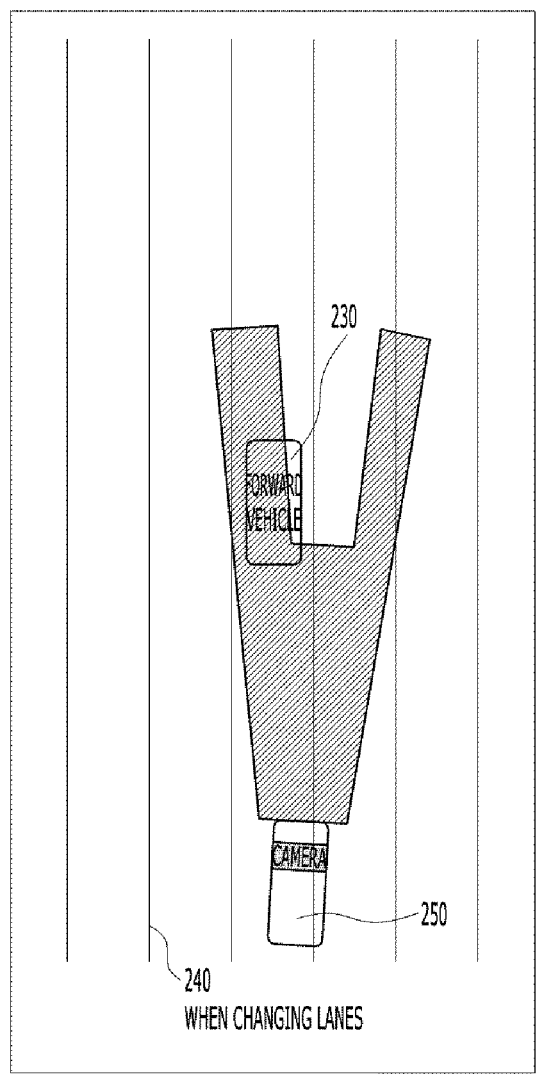

Furthermore, as shown in FIG. 6, when a driving condition changes, for example, when the subject vehicle 250 changes lanes or turns, some of the high beams of the headlamp of the subject vehicle 250 may illuminate the forward vehicle, and thus glare of a driver of the forward vehicle 230 may be unintentionally caused. For example, as shown in FIG. 6, when the center high beam positioned in the central region is turned off, and the right high beam positioned in the right region and the left high beam positioned in the left region are turned on in the headlamp of the subject vehicle 250, when the subject vehicle 250 performs a lane change in which a driving direction is turned to a right direction from a straight direction, glare of a driver of the forward vehicle 230 may be unintentionally caused by the left high beam positioned in the left region of the headlamp of the subject vehicle 250.

Figure 7:
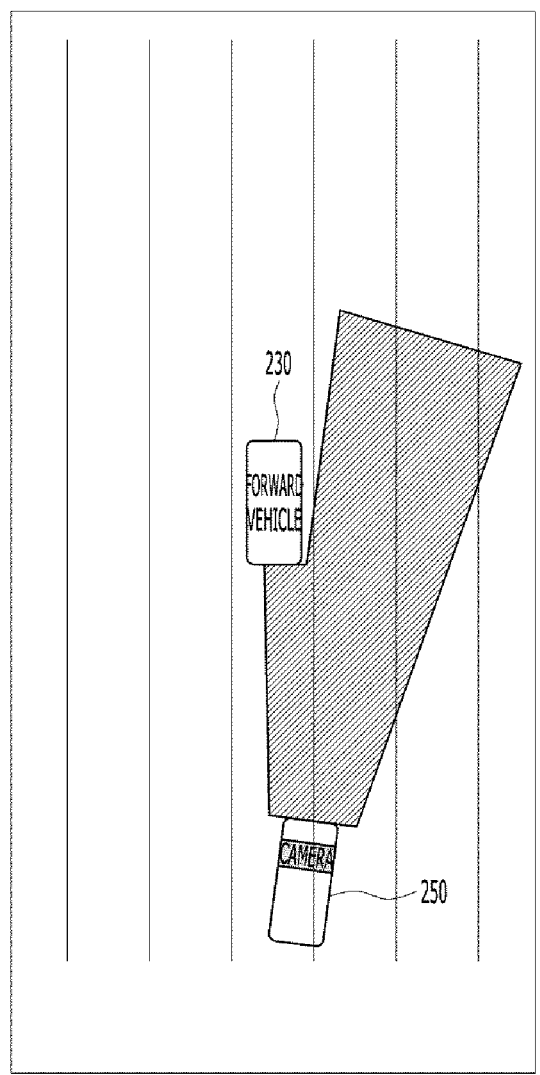

Accordingly, when the steering angle of the subject vehicle 250 is equal to or less than the reference value, a lane change may be detected in which a driving direction of the subject vehicle 250 is turned to a right or left direction from a straight direction, and therefore the high beams of the headlamp may be turned on or off based on the driving direction of the subject vehicle 250. For example, as shown in FIG. 7, when the steering angle of the subject vehicle 250 is greater than the reference value, and the controller detects that the driving direction of the subject vehicle 250 is turned to a right direction from a straight direction, the left high beam positioned in the left region of the headlamp among high beams of the headlamp may be turned off, thereby avoiding subjecting a driver of the forward vehicle 230 to glare.

According to the present invention, depending on the case, when the left high beam is turned off, whether the forward vehicle is present at the front right side of the subject vehicle 250 may be detected. When the forward vehicle is present at the front right side of the subject vehicle 250, the right high beam positioned in the right region of the headlamp may be turned on, and the center high beam positioned in the central region of the headlamp may be turned off among the high beams of the headlamp.

In other words, the left high beam positioned in the left region of the headlamp may be turned off to prevent the high beam from illuminating a first preceding vehicle positioned at a front side of a previously occupied lane, and simultaneously the center high beam positioned in the central region of the headlamp may be turned off to prevent the high beam from illuminating a second preceding vehicle positioned at a front side of a changed lane, thereby avoiding subjecting the driver of the preceding vehicle to glare. However, according to the present invention, when whether the forward vehicle is present at the front right side of the subject vehicle 250 is detected, if the forward vehicle is not present at the front right side of the subject vehicle 250, the right high beam positioned in the right region of the headlamp and the center high beam of the center region of the headlamp, among the high beams of the headlamp, may be turned on.

Figure 8:
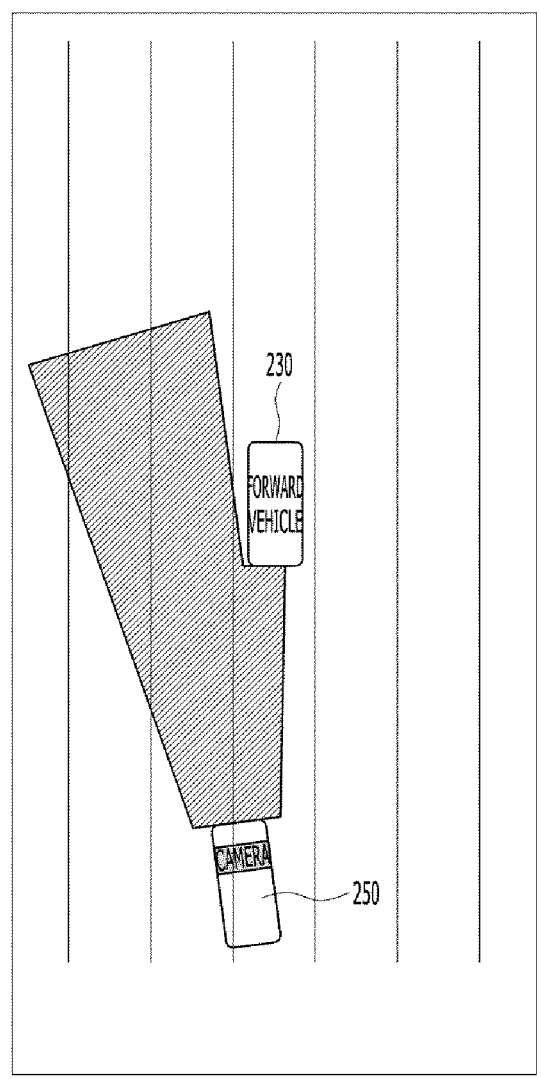

In another example, as shown in FIG. 8, when the steering angle of the subject vehicle 250 is greater than the reference value, and the controller detects that the driving direction of the subject vehicle 250 is turned to a left direction from a straight direction, the right high beam, positioned in the right region of the headlamp among high beams of the headlamp may be turned off, thereby avoiding subjecting the driver of the forward vehicle 230 to glare.

Depending on the case, when the right high beam is turned off, whether the forward vehicle is present at the front left side of the subject vehicle 250 may be detected. When the forward vehicle is present at the front left side of the subject vehicle 250, the left high beam positioned in the left region of the headlamp may be turned on and the center high beam positioned in the central region of the headlamp may be turned off, among the high beams of the headlamp.

In other words, the right high beam positioned in the right region of the headlamp may be turned off to prevent the high beam from illuminating a first preceding vehicle positioned at a front side of a previously occupied lane, and simultaneously the center high beam positioned in the central region of the headlamp may be turned off to prevent the high beam from illuminating a second preceding vehicle positioned at a front side of a changed lane, thereby avoiding subjecting the driver of the preceding vehicle to glare.

However, according to the present invention, when whether the forward vehicle is present at the front left side of the subject vehicle 250 is detected, if the forward vehicle is not present at the front left side of the subject vehicle 250, the left high beam positioned in the left region of the headlamp and the center high beam of the center region of the headlamp, among the high beams of the headlamp, may be turned on.

Figure 9:
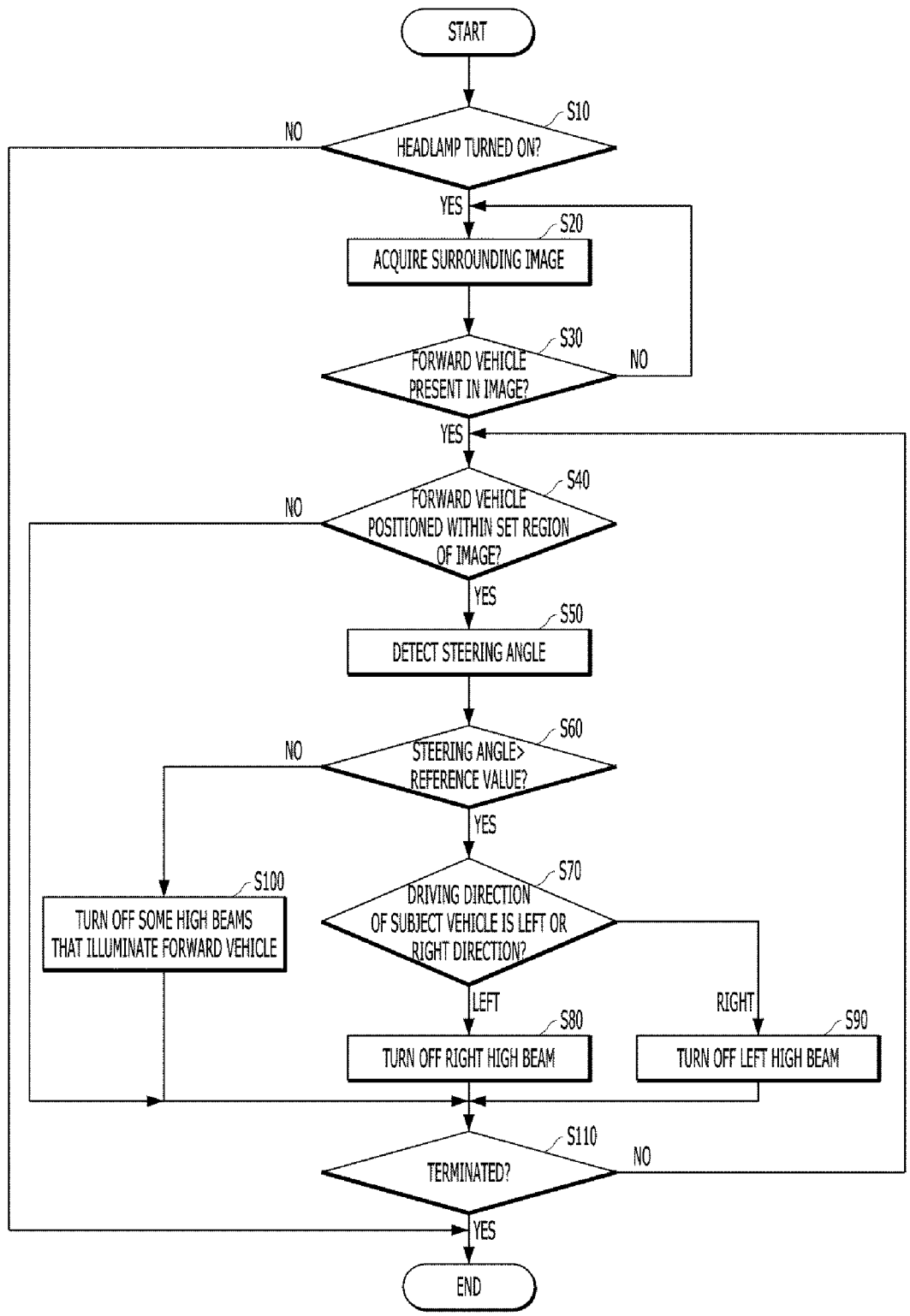
FIG. 9 is a flowchart of a method of controlling a vehicular headlamp according to an exemplary embodiment of the present invention.

FIG. 9 is a flowchart of a method of controlling a vehicular headlamp according to an exemplary embodiment of the present invention. As shown in FIG. 9, according to the present invention, whether a headlamp of a subject vehicle is turned on may be detected (S10). According to the present invention, when the headlamp of the subject vehicle is turned on, a surrounding image of the subject vehicle may be acquired using a camera (S20).

Then, according to the present invention, whether the forward vehicle is present in the acquired surrounding image may be detected (S30). In particular, whether a forward vehicle including at least one of a preceding vehicle and an oncoming vehicle is present in the acquired surrounding image may be detected. When the forward vehicle is present in the surrounding image, whether the forward vehicle is positioned within a set region of the image may be detected (S40).

When the forward vehicle is present, coordinates of the forward vehicle positioned in the image may be calculated, the position of the forward vehicle in the image may be detected based on the calculated coordinates, and whether the forward vehicle is positioned within the set region of the image may be detected based on the position of the forward vehicle. For example, the forward vehicle may be detected to be positioned within the set region if the forward vehicle is positioned within a central region of the acquired image.

In another example, the forward vehicle may be detected to be positioned within the set region if the forward vehicle is positioned within a driving lane of the subject vehicle in the acquired image. In addition, the forward vehicle may be detected to be positioned within the set region if a first condition, in which the forward vehicle is positioned within the central region of the acquired image, and a second condition, in which the forward vehicle is positioned within the driving lane of the subject vehicle, are satisfied.

In yet another example, when whether the forward vehicle is positioned within the set region is detected, if the forward vehicle is positioned at a boundary of the set region, whether the forward vehicle overlaps the set region by about 50% or more may be detected. When the forward vehicle overlaps the set region by about 50% or more, the forward vehicle may be detected to be positioned within the set region. In particular, when the forward vehicle does not overlap the set region by about 50% or more, the forward vehicle may not be recognized to be positioned within the set region.

According to the present invention, when the forward vehicle is positioned within the set region of the image, a steering angle of the subject vehicle may be detected (S50). Then, whether the detected steering angle of the subject vehicle is greater than a preset reference value may be detected (S60). When the steering angle of the subject vehicle is greater than the reference value, whether a driving direction of the subject vehicle is a left or right direction may be detected (S70).

According to the present invention, when the driving direction of the subject vehicle is a right direction, the left high beam positioned in the left region of the headlamp among the high beams of the headlamp may be turned off (S90). Depending on the case, when the left high beam is turned off, whether the forward vehicle is present at the front right side of the subject vehicle may be detected, and when the forward vehicle is present at the front right side of the subject vehicle, the right high beam positioned in the right region of the headlamp may be turned on and the center high beam positioned in the central region of the headlamp may be turned off, among the high beams of the headlamp.

Particularly, when the forward vehicle is not present at the front right side of the subject vehicle, the right high beam positioned in the right region of the headlamp and the center high beam positioned in the central region of the headlamp may be turned on, among the high beams of the headlamp. When the driving direction of the subject vehicle is a left direction, the right high beam positioned in the right region of the headlamp among the high beams of the headlamp may be turned off (S80).

Depending on the case, when the right high beam is turned off, whether the forward vehicle is present at the front left side of the subject vehicle may be detected, and when the forward vehicle is present at the front left side of the subject vehicle, the left high beam positioned in the left region of the headlamp may be turned on and the center high beam positioned in the central region of the headlamp may be turned off among the high beams of the headlamp. When no forward vehicle is present at the front left side of the subject vehicle, the left high beam positioned in the left region of the headlamp and the center high beam positioned in the central region of the headlamp may be turned on among the high beams of the headlamp.

Additionally, when the steering angle of the subject vehicle is less than the reference value, some high beams that illuminate the forward vehicle positioned within the set region of the image among the high beams of the headlamp may be turned off (S100). For example, when some high beams are turned off, the center high beam positioned in the central region of the headlamp may be turned off.

When the left high beam or the right high beam of the headlamp is turned off, if the steering angle of the subject vehicle is greater than the reference value, whether the high beam of the headlamp is turned on may be detected. When the high beam of the headlamp is turned on, the left high beam or the right high beam of the headlamp may be turned off. In particular, when the high beam of the headlamp is not turned on, control of the headlamp of the subject vehicle may be terminated.

According to the present invention, when the current situation is a situation in which control of the headlamp is terminated, control of the headlamp of the subject vehicle may be terminated (S110). For example, the situation in which control of the headlamp is terminated may include a situation in which the subject vehicle is turned off and a situation in which a headlamp is turned off based on external illumination without being limited thereto. Accordingly, some of the high beams of the headlamp may be turned off based on the steering angle of the subject vehicle, preventing a malfunction of the high beam and avoiding subjecting other drivers to glare.

According to the present invention, a non-transitory computer readable recording medium having recorded thereon a program for executing a headlamp control method of an apparatus for controlling a vehicular headlamp may perform procedures provided by the headlamp control method of the apparatus for controlling a vehicular headlamp according to an embodiment of the present invention.

In the apparatus for controlling a vehicular headlamp, the method of controlling a vehicular headlamp thereof, and the vehicle including the apparatus as configured above according to at least one exemplary embodiment of the present invention, some of the high beams of the headlamp may be turned off based on the steering angle of the subject vehicle, thereby preventing a malfunction of a high beam and avoiding subjecting drivers of other vehicles to glare.

The present invention may achieve an effect whereby marketability is enhanced and investment costs are not incurred. In other words, according to the present invention, a region of a high beam that causes glare may be removed while preventing costs or weight from increasing. In addition, the present invention is implemented using data currently used in vehicles, and thus ease of implementation may be improved.

It will be appreciated by persons skilled in the art that that the effects that could be achieved with the present invention are not limited to what has been particularly described hereinabove and other advantages of the present invention will be more clearly understood from the detailed description.

The aforementioned present invention can also be embodied as computer readable code stored on a non-transitory computer readable recording medium. The non-transitory computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

What is claimed is:

1. An apparatus for controlling a vehicular headlamp, comprising:
    an image capture unit configured to acquire a surrounding image of a subject vehicle;
    a steering angle detection unit configured to detect a steering angle of the subject vehicle; and
    a controller configured to operate a headlamp of the subject vehicle based on the steering angle of the subject vehicle,
    wherein the controller is configured to detect whether a forward vehicle is present from the acquired surrounding image when the headlamp of the subject vehicle is turned on, detect whether the forward vehicle is positioned within a set region of the image when the forward vehicle is present, and turn off some of high beams of the headlamp based on the detected steering angle of the subject vehicle when the forward vehicle is positioned within the set region of the image.

2. The apparatus of claim 1, wherein in response to detecting whether the forward vehicle is present from the acquired surrounding image, the controller is configured to detect whether a forward vehicle including at least one of a preceding vehicle and an oncoming vehicle is present in the acquired image.

3. The apparatus of claim 1, wherein, when detecting whether the forward vehicle is positioned within the set region of the image, the controller is configured to calculate coordinates of the forward vehicle positioned in the image when the forward vehicle is present, detect a position of the forward vehicle in the image based on the calculated coordinates, and detect whether the forward vehicle is positioned within the set region of the image based on the position of the forward vehicle.

4. The apparatus of claim 1, wherein, when turning off some of the high beams of the headlamp based on the detected steering angle of the subject vehicle, the controller is configured to:
    detect whether the detected steering angle of the subject vehicle is greater than a preset reference value when the forward vehicle is positioned within the set region of the image; and
    turn off a left high beam positioned in a left region of the headlamp or a right high beam positioned in a right region of the headlamp among the high beams of the headlamp when the steering angle of the subject vehicle is greater than the reference value.

5. The apparatus of claim 4, wherein, when turning off the left high beam or the right high beam of the headlamp, the controller is configured to:
    detect whether the high beam of the headlamp is turned on when the steering angle of the subject vehicle is greater than the reference value; and
    turn off the left high beam or the right high beam of the headlamp when the high beam of the headlamp is turned on.

6. The apparatus of claim 4, wherein, when turning off the left high beam or the right high beam of the headlamp, the controller is configured to:
    detect a turning direction of the subject vehicle based on the steering angle of the subject vehicle when the steering angle of the subject vehicle is greater than the reference value; and
    turn off the left high beam or the right high beam of the headlamp based on turning direction of the subject vehicle.

7. The apparatus of claim 6, wherein, when turning off the left high beam or the right high beam of the headlamp according to the turning direction of the subject vehicle, the controller is configured to:
    turn off the left high beam positioned in the left region of the headlamp among the high beams of the headlamp when the turning direction of the subject vehicle is detected as a right direction; and turn off the right high beam positioned in the right region of the headlamp among the high beams of the headlamp when the turning direction of the subject vehicle is detected as a left direction.

8. The apparatus of claim 4, wherein, when turning off the left high beam or the right high beam of the headlamp, the controller is configured to:
   detect whether the high beam of the headlamp is turned on when the steering angle of the subject vehicle is greater than the reference value;
   detect the turning direction of the subject vehicle based on the steering angle of the subject vehicle when the high beam of the headlamp is turned on; and
   turn off the left high beam or the right high beam of the headlamp based on the turning direction of the subject vehicle.

9. The apparatus of claim 8, wherein, when turning off the left high beam or the right high beam of the headlamp according to a turning direction of the subject vehicle, the controller is configured to:
   turn off the left high beam positioned in the left region of the headlamp among the high beams of the headlamp when the turning direction of the subject vehicle is detected as a right direction; and
   turn off the right high beam positioned in the right region of the headlamp among the high beams of the headlamp when the turning direction of the subject vehicle is detected as a left direction.

10. The apparatus of claim 4, wherein, when detecting whether the detected steering angle of the subject vehicle is greater than a preset reference value, the controller is configured to:
    detect a driving change including a lane change or a turn of the subject vehicle when the steering angle of the subject vehicle is greater than the reference value.

11. The apparatus of claim 4, wherein, when detecting whether the detected steering angle of the subject vehicle is greater than a preset reference value, the controller is configured to:
    turn off some high beams that illuminate the forward vehicle positioned within the set region of the image among the high beams of the headlamp when the steering angle of the subject vehicle is less than the reference value.

12. A method of controlling a headlamp of an apparatus for operating a vehicular headlamp, including an image capture unit, a steering angle detection unit, and a controller configured to operate a headlamp of a subject vehicle, the method comprising:
    detecting, by the controller, whether the headlamp of the subject vehicle is turned on;
    detecting, by the controller, whether a forward vehicle is present from a surrounding image acquired by the image capture unit upon turning on the headlamp of the subject vehicle;
    detecting, by the controller, whether the forward vehicle is positioned within a set region of the image when the forward vehicle is present; and
    turning off, by the controller, some high beams of the headlamp based on a steering angle of the subject vehicle, detected by the steering angle detection unit, when the forward vehicle is positioned within the set region of the image.

13. The method of claim 12, wherein the detecting whether the forward vehicle is present from the surrounding image includes:
    detecting, by the controller, whether the forward vehicle including at least one of a preceding vehicle and an oncoming vehicle is present from the acquired surrounding image.

14. The method of claim 12, wherein the detecting of whether the forward vehicle is positioned within the set region of the image includes:
    calculating, by the controller, coordinates of the forward vehicle positioned in the image when the forward vehicle is present;
    detecting, by the controller, a position of the forward vehicle in the image based on the calculated coordinates; and
    detecting, by the controller, whether the forward vehicle is positioned within the set region of the image based on the position of the forward vehicle.

15. The method of claim 12, wherein the turning off the some high beams of the headlamp based on the detected steering angle of the subject vehicle includes:
    detecting, by the controller, whether the detected steering angle of the subject vehicle is greater than a preset reference value when the forward vehicle is positioned within the set region of the image; and
    turning off, by the controller, a left high beam positioned in a left region of the headlamp or a right high beam positioned in a right region of the headlamp among the high beams of the headlamp when the steering angle of the subject vehicle is greater than the reference value.

16. The method of claim 15, wherein the turning off the left high beam or the right high beam of the headlamp includes:
    detecting, by the controller, whether the high beam of the headlamp is turned on when the steering angle of the subject vehicle is greater than the reference value; and
    turning off, by the controller, the left high beam or the right high beam of the headlamp when the high beam of the headlamp is turned on.

17. The method of claim 12, wherein the turning off the left high beam or the right high beam of the headlamp includes:
    detecting, by the controller, a turning direction of the subject vehicle based on the steering angle of the subject vehicle when the steering angle of the subject vehicle is greater than the reference value; and
    turning off, by the controller, the left high beam or the right high beam of the headlamp based on a turning direction of the subject vehicle.

18. The method of claim 17, wherein the turning off the left high beam or the right high beam of the headlamp based on the turning direction of the subject vehicle includes:
    turning off, by the controller, the left high beam positioned in the left region of the headlamp among the high beams of the headlamp when the turning direction of the subject vehicle is detected as a right direction; and
    turning off, by the controller, the right high beam positioned in the right region of the headlamp among the high beams of the headlamp when the turning direction of the subject vehicle is detected as a left direction.

19. The method of claim 12, wherein the detected whether the detected steering angle of the subject vehicle is greater than the preset reference value includes:
    detecting, by the controller, a driving change including a lane change or a turn of the subject vehicle when the steering angle of the subject vehicle is greater than the reference value.

20. The method of claim 12, wherein the detected whether the detected steering angle of the subject vehicle is greater than the preset reference value includes:

turning off, by the controller, some high beams that illuminate the forward vehicle positioned within the set region of the image among the high beams of the headlamp when the steering angle of the subject vehicle is less than the reference value.

* * * * *